United States Patent
Tseng et al.

(10) Patent No.: US 9,049,364 B2
(45) Date of Patent: Jun. 2, 2015

(54) FOCUS ADJUSTING METHOD AND IMAGE CAPTURE DEVICE THEREOF

(71) Applicant: HTC Corporation, Taoyuan County (TW)

(72) Inventors: Fu-Chang Tseng, Taoyuan County (TW); Chen-Si Dai, Taoyuan County (TW); Ying-Ru Lai, Taoyuan County (TW); Hsin-Ti Chueh, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 168 days.

(21) Appl. No.: 13/735,038

(22) Filed: Jan. 7, 2013

(65) Prior Publication Data

US 2013/0208166 A1    Aug. 15, 2013

Related U.S. Application Data

(60) Provisional application No. 61/597,847, filed on Feb. 13, 2012.

(51) Int. Cl.
H04N 5/232    (2006.01)

(52) U.S. Cl.
CPC ....... H04N 5/23212 (2013.01); H04N 5/23293 (2013.01)

(58) Field of Classification Search
CPC .................................................. H04N 5/23212
USPC ........................... 348/345, 349, 350, 353–356
See application file for complete search history.

(56) References Cited

U.S. PATENT DOCUMENTS

| | | | |
|---|---|---|---|
| 7,957,633 B2 * | 6/2011 | Uehara | 396/124 |
| 8,599,283 B2 | 12/2013 | Matsunaga | |
| 2006/0238640 A1 * | 10/2006 | Hofer | 348/345 |
| 2006/0291845 A1 | 12/2006 | Sugimoto | |
| 2008/0187185 A1 | 8/2008 | Misawa | |
| 2008/0297648 A1 * | 12/2008 | Furuki et al. | 348/345 |
| 2009/0079862 A1 * | 3/2009 | Subbotin | 348/345 |
| 2009/0290046 A1 | 11/2009 | Kita | |
| 2011/0001840 A1 | 1/2011 | Ishii | |
| 2011/0128434 A1 | 6/2011 | Hata | |
| 2011/0261251 A1 * | 10/2011 | Okamoto et al. | 348/345 |
| 2012/0218460 A1 * | 8/2012 | Eichinger | 348/345 |
| 2013/0235252 A1 * | 9/2013 | Tseng et al. | 348/349 |

FOREIGN PATENT DOCUMENTS

| | | |
|---|---|---|
| CN | 101753833 A | 6/2010 |
| JP | 2011103558 | 5/2011 |
| TW | I336588 | 1/2011 |
| WO | WO 2011039049 A1 * | 4/2011 |

* cited by examiner

*Primary Examiner* — Timothy J Henn
(74) *Attorney, Agent, or Firm* — Winston Hsu; Scott Margo

(57) ABSTRACT

By determining using a linear adjustment, a directional adjustment, or a focus scan adjustment on a movable lens unit according to which range region the sharpness of a digital image or a region of interest of the digital image falls in, best focus control performance may be simply and rapidly fulfilled.

5 Claims, 5 Drawing Sheets

FOCUS ADJUSTING METHOD AND IMAGE CAPTURE DEVICE THEREOF

CROSS REFERENCE TO RELATED APPLICATIONS

This application claims priority of U.S. Provisional Application No. 61/597,847 filed on Feb. 13, 2012.

BACKGROUND OF THE INVENTION

1. Field of the Invention

The present invention relates to a focus adjusting method and an image capture device thereof, and more particularly, a focus adjusting method according to the sharpness of a captured image.

2. Description of the Prior Art

Portable image capture devices, such as digital camera, mobile phone and/or tablet, are widely used by consumers these days. To capture an image with good quality, there are many parameters need to be adjusted according to the change of scene. For example, the exposure needs to be adjusted according to a surrounding light condition, and a focus needs to be adjusted with respect to one or more target object of the scene. Typically, when shooting a portrait image, the focus is set to be at the face of the target person, which may be identified by face detection, or is manually set by the user. For other types of subjects, the focus may be simply set at the center of the scene. However, the focus may not be adjusted very precisely by the abovementioned methods since they only consider the distance relationship of the image capture device to the scene or the object. As a result, there is a need for an improved focus adjusting mechanism that can provide images with better image quality.

SUMMARY OF THE INVENTION

The claimed invention discloses a focus adjusting method. The focus adjusting method comprises capturing a digital image by an image sensor module comprising a lens unit; calculating a color characteristic of the digital image in the RAW image domain; determining a focus control algorithm according to the color characteristic; generating a focus control signal according to the focus control algorithm; and adjusting the lens unit of the image sensor module according to the focus control signal.

The claimed invention further discloses a focus adjusting method. The focus adjusting method comprises capturing a digital image by an image sensor module comprising a lens unit; determining a region of interest (ROI) within the digital image; calculating a sharpness value corresponding to the digital image according to pixels in the ROI of the digital image; and determining a number of steps and a direction for moving the lens unit according to the sharpness value; in response to the sharpness value which is in a first range, moving the lens unit by a first number of steps in a first direction, the first number and the first direction being derived from a linear relationship; and in response to the sharpness value which is in a second range, moving the lens unit by a second number of steps in a second direction. The second number is predetermined.

The claimed invention discloses an image fetching device. The image fetching device comprises an image sensor module, comprising a movable lens unit and configured to capture a digital image and adjust a position of the lens unit according to a focus control signal; a first image processing unit, configured to parse the digital image in the RAW domain and configured to determine a color characteristic of the digital image; and a second image processing unit, configured to determine a focus control algorithm according to the color characteristic of the digital image, and provides the focus control signal to the sensor module according to the focus control algorithm. In response to the color characteristic in a first range, the control algorithm is a linear adjustment; in response to the color characteristic in a second range, the control algorithm is a directional adjustment; and in response to the color characteristic in a third range, the control algorithm is a focus scan adjustment.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a focus adjusting method and an image capture device utilizing the focus adjusting method, for the purpose of adjusting a focus of a camera lens of the image capture device to avoid the difficulties of manually adjusting the focus of the camera lens to fulfill a best sharpness performance of a captured digital image.

Figure 1:
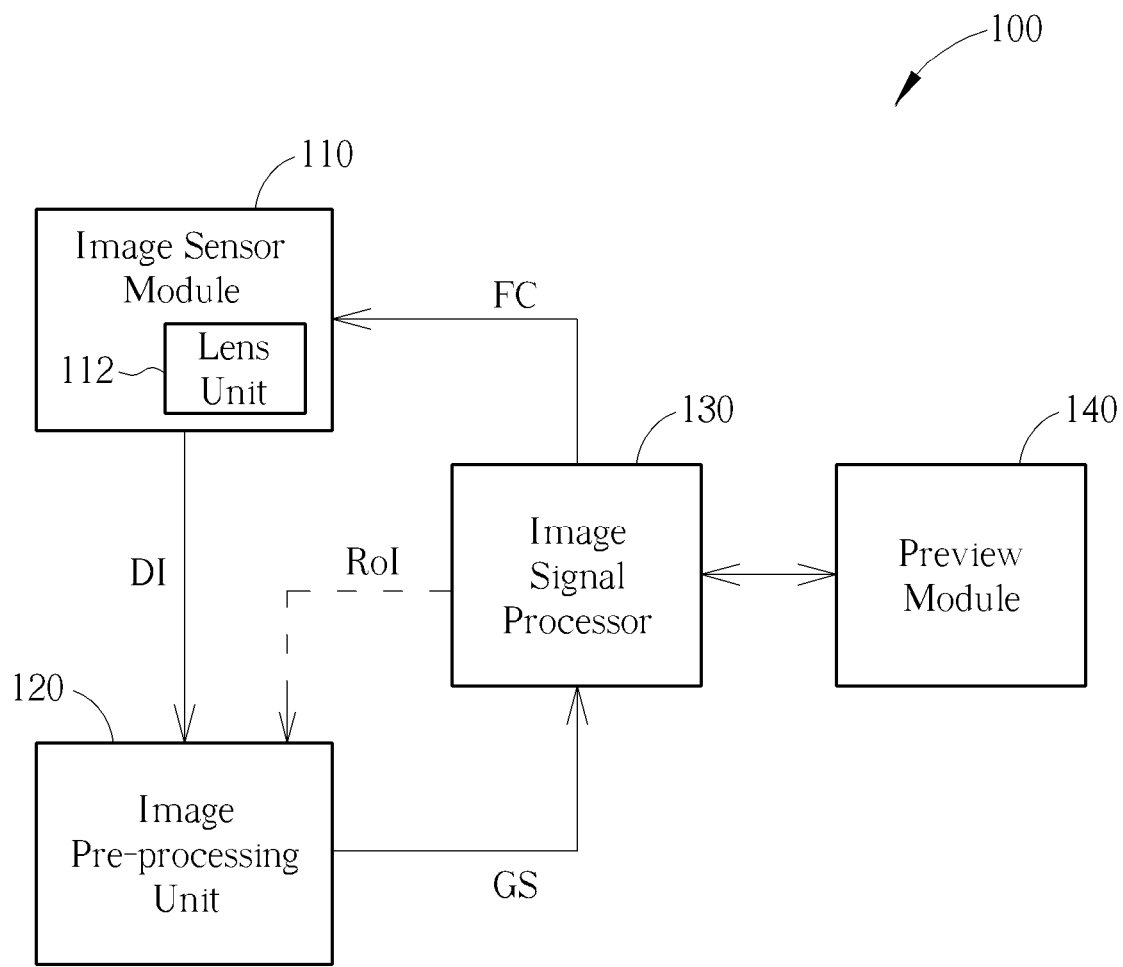
FIG. 1 illustrates an image capture device according to one embodiment of the present invention.

Please refer to FIG. 1, which illustrates an image capture device 100 according to one embodiment of the present invention. As shown in FIG. 1, the image capture device 100 includes an image sensor module 110, an image pre-processing unit 120, an image signal processor(ISP) 130 and a preview module 140.

The image sensor module 110 comprises a lens unit 112, which is movable, and is configured to capture a digital image DI in the RAW data format. A digital image DI may be later converted into a RGB format, a YUV format, or a HSV format by the image signal processor unit 130 for further processing.

The image pre-processing unit 120 is configured to parse the digital image DI in the RAW image domain, which is not viewable to human eyes, to generate color characteristics information of the digital image DI, such as sharpness, and is configured to derive focus state information of the digital image DI according to the color characteristics. The focus state information may be derived from color characteristics of the digital image DI by comparing the color statistics with some predetermined conditions. The color statistics may include a sharpness value, a confidence value, a defocus value, and/or other values. The color statistics may suggest a focus state indicating that, for example, the better the sharpness is, the better the focus is. Therefore, by determining the range conditions, corresponding to each focus state that the color statistics lies in, it can be determined what focus state might be for a current image. And thus it can be determined which focus control algorithm to be used for adjusting the focus of the image capture device. Note that the color characteristics of the digital image DI for different color channels (e.g. the color channels R, G and B) may be parsed independently or together in at least one embodiment of the present invention.

The image signal processor 130 is configured to perform various operations on the digital image DI and provide control signals to the image sensor module 110 for adjusting the focus. The image signal processor 130 may determine a focus control algorithm according to the focus state indicated by the color characteristics received from the image pre-processing unit 120 so as to control the movement of the lens unit 112 of the sensor module 110. The image signal processor 130 generates a focus control signal FC according to the determined focus control algorithm. The image sensor module 110 is further configured to move the lens unit 112 according to the focus control signal FC.

The preview module 140 is optionally disposed in the image capture device 100 for displaying the digital image DI captured by the image sensor module 110.

In one embodiment of the invention, the focus control method is implemented in the image signal processor 130 for determining a focus control algorithm and providing corresponding focus control signal to adjust the lens of the image sensor module 110. In this embodiment, the focus control algorithm is determined according to a range that the sharpness value of the digital image DI lies in. Please refer to FIG. 2, which schematically illustrates different ranges of the sharpness.

Figure 2:
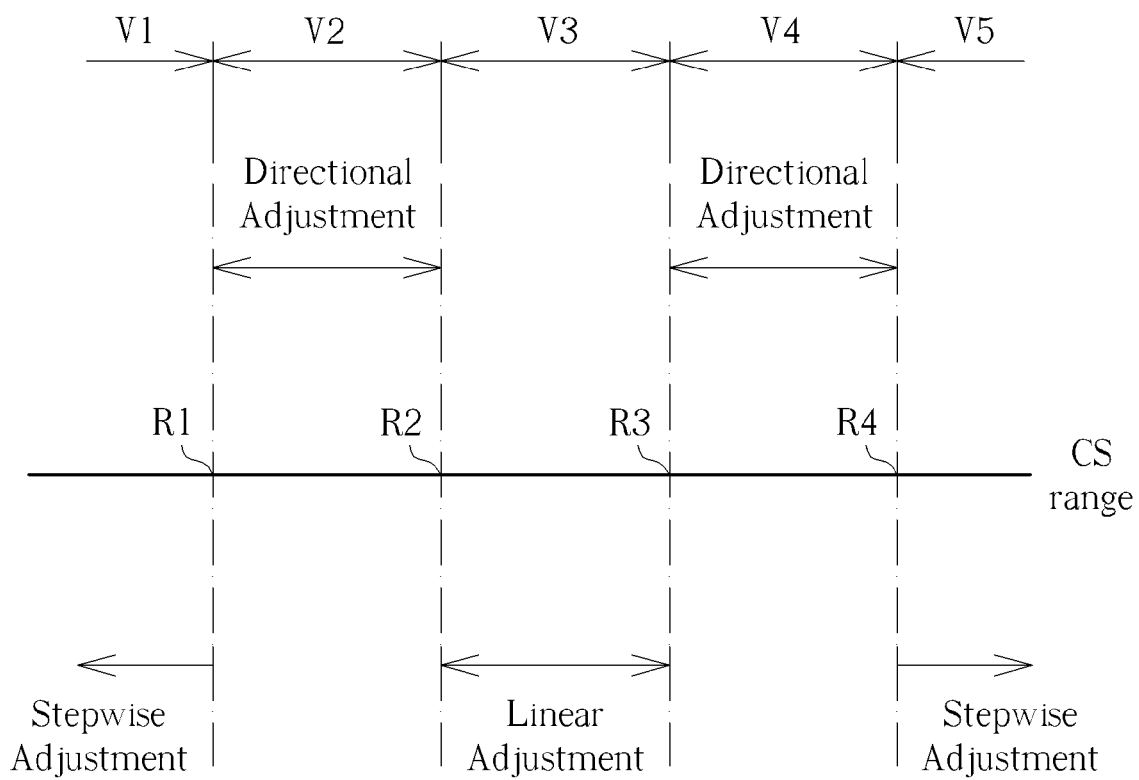
FIG. 2 schematically illustrates different ranges of sharpness of a digital image.

As can be understood by one with ordinary skills in the art, the sharpness of an image may suggest its corresponding focus state. When the lens unit 112 of the image sensor module 110 is at a position in focus, the sharpness of the digital image DI thus captured should be better. On the contrary, if the lens unit 112 is at a position out of focus, the sharpness of the digital image DI thus captured would be worse. As a result, the sharpness and the position of the lens unit 112 may form a relationship that suggests change of the focus state from one position to another. In the embodiment of FIG. 2, the focus state is defined in 3 ranges: linear range, directional range and out of focus range. In linear range, the sharpness and the lens position forms a linear relationship. By obtaining the slope of the linear relationship, it can be computed what sharpness is for certain lens position within this linear range. Consequently, it can be known whether the lens unit 112 of the sensor module 110 is at a position having a comparatively best focus, and if not, which direction and how many steps should the lens unit 112 move to reach an optimal position having comparatively best focus. In directional range, there is no such linear relationship between the sharpness and the lens position. However, it can be observed what direction that the lens unit 112 should move toward but may not be able to know the exact number of steps. In the out of focus range, the sharpness cannot provide any information of the moving steps and direction. It may be due to that the lens unit 112 is at a position that is far away from or too close to the scene to be taken, or the surrounding condition is very bad, such as low light. As a result, the image signal processor 130 may use different focus control algorithms for adjusting the position of the camera lens with respect to these range conditions.

As shown in FIG. 2, the sharpness may be divided in 3 range conditions and each range condition corresponds to a different focus control algorithm respectively. The three range conditions can be defined by four sharpness thresholds R1, R2, R3 and R4. The sharpness thresholds R1, R2, R3 and R4 are defined according to the relationship between the sharpness, the focus state, and/or system capability of the image capture module 100. A first range V1 is defined for sharpness values smaller than the sharpness threshold R1. A second range region V2 is defined for sharpness values between the sharpness thresholds R1 and R2. A third range region V3 is defined for sharpness values between the sharpness thresholds R2 and R3. A fourth range region V4 is defined for sharpness values between the sharpness thresholds R3 and R4. A fifth range region V5 is defined for sharpness values larger than the sharpness threshold R4.

Note that higher sharpness is not necessarily directed to a best sharpness performance. Therefore, the sharpness thresholds R1, R2, R3 and R4 are determined according to different experiments about sharpness performances, according to one embodiment of the present invention.

Figure 3:
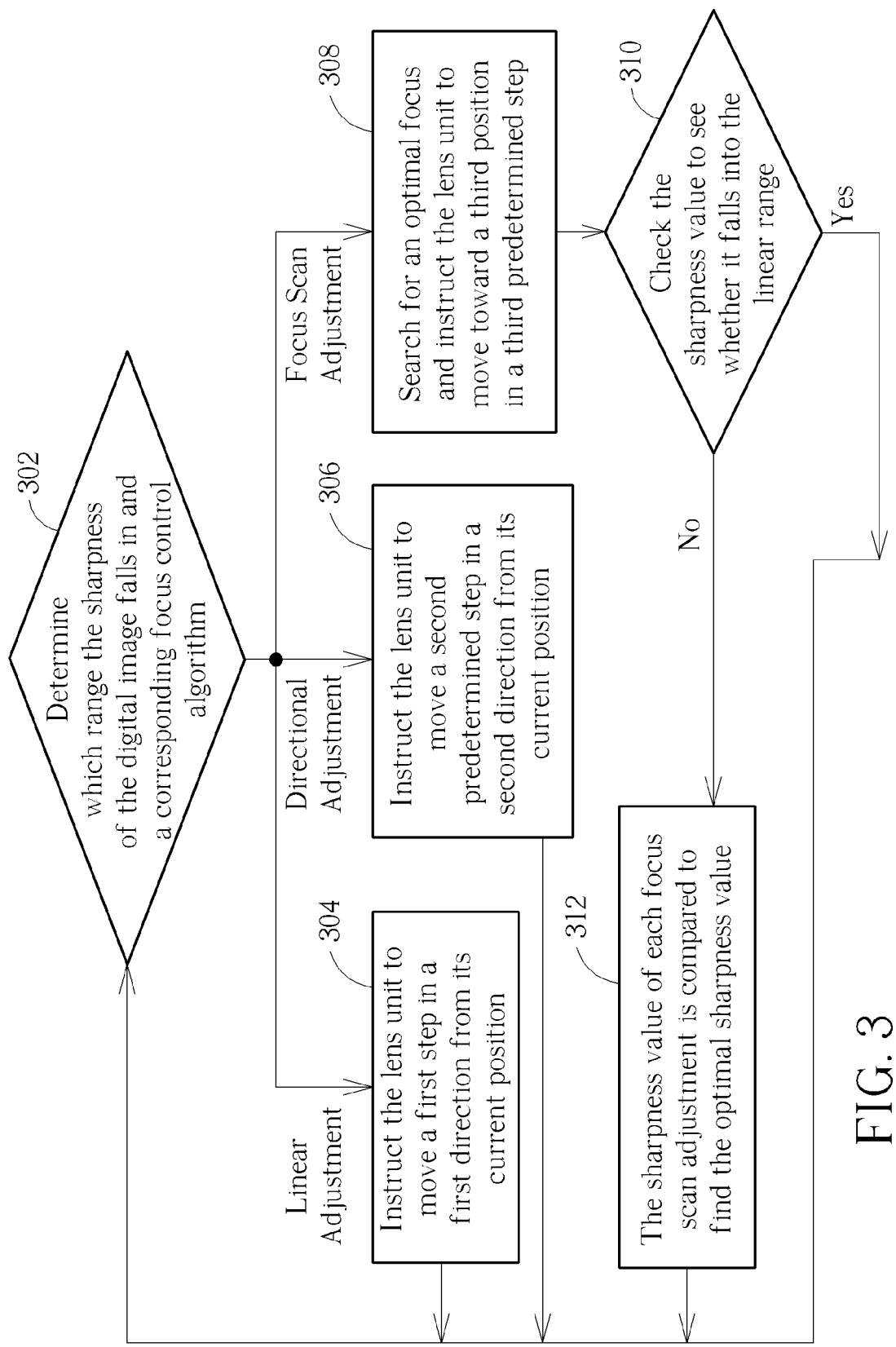
FIG. 3 illustrates a flowchart of focus control algorithm determination according to the range regions shown in FIG. 2.

Please refer to FIG. 3, which illustrates a flowchart of focus control algorithm determination according to the range regions shown in FIG. 2. FIG. 3 includes steps as the following:

Step 302: Determine which range the sharpness of the digital image DI falls in and a corresponding focus control algorithm. When the sharpness falls in the range V3, which is a linear range, the corresponding focus control algorithm is selected as a linear adjustment, and the flow goes to Step 304. When the sharpness falls in the range V2 or V4, which is a directional range, the corresponding focus control algorithm is selected as a directional adjustment, and the flow goes to Step 306. When the sharpness CS falls in the range V1 or V5, which means out of range, the corresponding focus control algorithm is selected as a focus scan adjustment of the position of the lens, and the flow goes to Step 308.

Step 304: For the linear adjustment, the focus signal instructs the lens unit 112 to move a first step in a first direction from its current position. The first step and the first direction can be calculated according to a linear relationship between the sharpness value and the current position of the lens unit 112. And the flow goes back to Step 302 to check a new sharpness value.

Step 306: For the directional adjustment, the focus signal instructs the lens unit 112 to move a second predetermined step in a second direction from its current position. In the case that the sharpness value falls within the directional range, only the moving direction of the lens 112 can be determined since the relationship between the sharpness value and the lens position is unknown. Therefore, the second step is predetermined. And the flow goes to Step 302.

Step 308: For the focus scan adjustment, it means that the current focus is currently out of focus range, and thus the image capture device 100 would search for an optimal focus. The focus control signal would instruct the lens unit 112 to move toward a third position in a third predetermined step. The third position is determined according to the current position of the lens unit 112. In one embodiment of the invention, in the case that the sharpness value suggests the lens unit 112 is at a position far from the scene, the lens unit 112 would move in a direction toward the scene. In the case that the sharpness suggests that the lens unit 112 is at a position close to the scene, the lens unit 112 would move in another direction away from the scene. Next the flow goes to Step 310 to check the sharpness value of each focus scan adjustment.

Step 310: The sharpness value is checked to see whether it falls into the linear range. If so, the flow goes back to Step 302 so that the focus control algorithm is switched to be the linear adjustment. If not so, the flow forwards itself to Step 312 to find an optimal position. In some critical conditions, such as a low light condition, the sharpness value may not be able to be converged into the linear range; therefore, the optimal position of the camera lens, i.e. with a best sharpness value, is searched instead.

Step 312: The sharpness value of each focus scan adjustment is compared to find the optimal sharpness value, for example, a peak value. The corresponding lens position is thus determined as an optimal position. The lens unit 112 would move itself to the optimal position, and the flow goes back to Step 302 again.

In Step 302, the focus control algorithm is determined according to the range where the sharpness value corresponding to the lens position falls in. Usually, the better the sharpness value is, the better the focus position is. Therefore, the sharpness value can be used as an indicator of a focus degree. In other embodiments of the invention, other color characteristics can also be used as focus degree indicators too, such as a confidence level.

In one embodiment of the invention, the third region V3 is defined for a best sharpness performance so that merely a tiny adjustment is required, i.e. a linear adjustment. As indicated by Step 304, when the current sharpness value CS falls in the range region V3, a linear adjustment is performed by adjusting the position of the lens unit 112 of the sensor module 110 by a predetermined step, which may be a focus length offset or a rotational angle offset. Both of the focus length and the rotational angle offset can be calculated using a common formula for determining a focus location of the lens unit 112.

In one embodiment of the invention, the range regions V2 and V4 are defined for a slightly-worse sharpness effect than the range region V3. As indicated by Step 306, when the current sharpness CS falls in the range region V2 or V4, a directional adjustment is applied for moving the position of the lens unit 112 in a direction that the current sharpness CS is continuously changed to be closer to the range region V3, until the current sharpness CS falls in the range region V3. Then the linear adjustment will be applied for giving a best sharpness performance.

In one embodiment of the invention, the range regions V1 and V5 are defined for a worst sharpness effect that the image capture device 100 cannot directly handle using the linear adjustment or the directional adjustment. Besides, the moving direction of the lens position to reach better sharpness cannot be directly determined when the current sharpness CS falls in the range regions R1 and R5. Therefore, as indicated by Step 308, Step 310, and Step 312, a focus scan adjustment is required for handling the condition.

The focus scan adjustment includes two primary steps: (1) move the lens unit 112 by a predetermined step in a first predetermined direction and check whether the sharpness value corresponding to the current lens position is better than its previously-corresponding lens position, as indicated by Step 308 and Step 310; (2-1) in response to the condition that the sharpness value gets better, the lens unit 112 is moved again toward the first predetermined direction by the predetermined step, as indicated by Step 310 and the flow would repeat from Step 302 again until the current sharpness CS falls in one of the range regions R2, R3 and R4 for the directional adjustment or the linear adjustment. (2-2) Else, in response to the condition that the sharpness gets worse after the first adjustment, the lens unit 112 is moved toward a second predetermined direction opposite to the first predetermined direction in a second predetermined step. As indicated by Step 312 and the flow would repeat from Step 302 again until the current sharpness CS falls on one of the range regions R2, R3 and R4 for the directional adjustment or the linear adjustment. Note that the second predetermined step may be larger than the first predetermined step since the direction of adjustment has been roughly fixed while utilizing the second predetermined step in some embodiments of the present invention. In some embodiments of the present invention, the second predetermined step is determined to be equal to half of the length of the third range region.

The focus control signal FC is generated in response to any command of moving the lens unit 112 of the image sensor module 110. The image sensor module 110 acts in response to the focus control signal FC for accomplishing the abovementioned adjustments.

Figure 4:
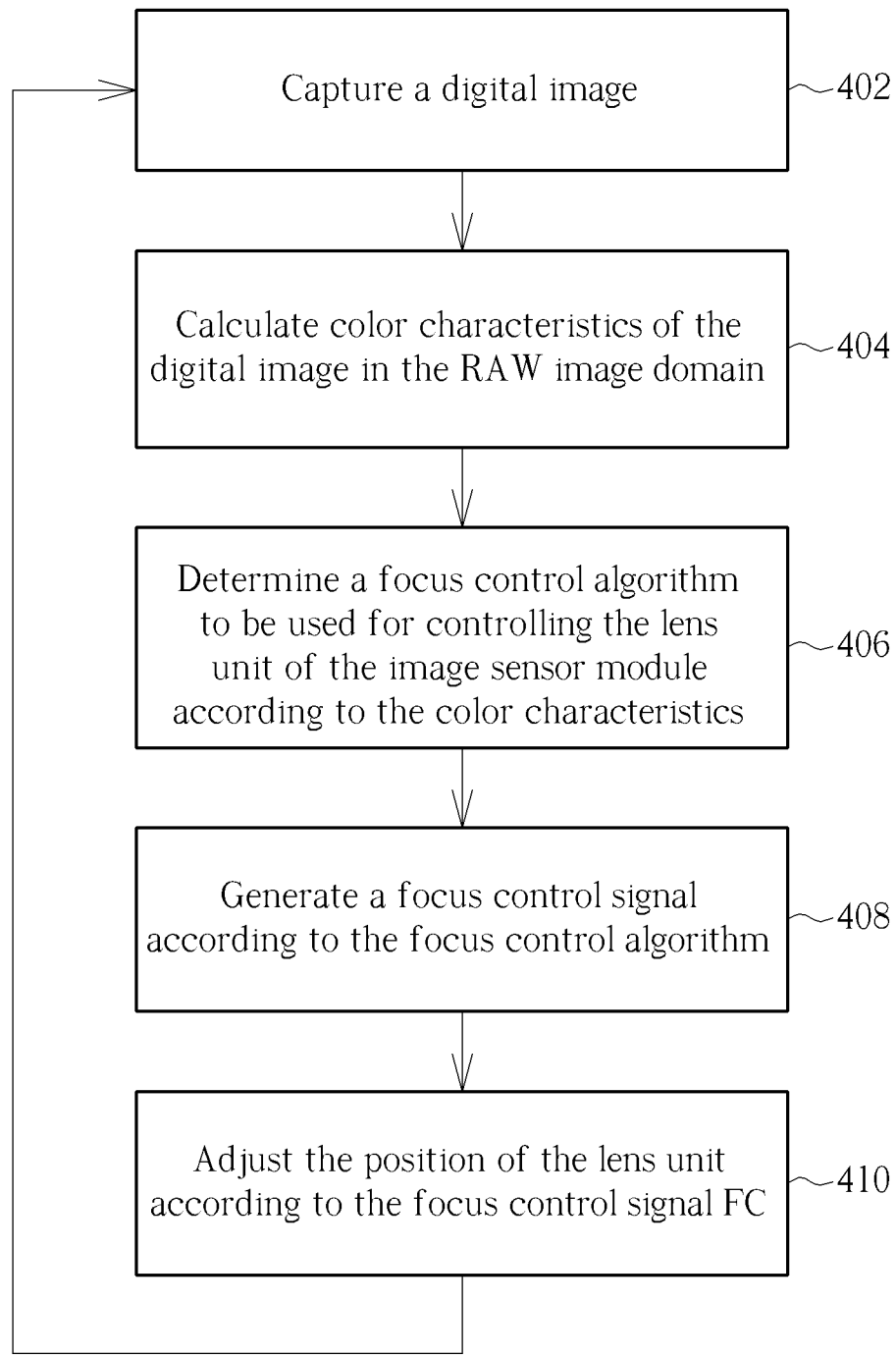
FIG. 4 illustrates the focus adjusting method according to an embodiment of the present invention related to FIGS. 1-3.

Please refer to FIG. 4, which illustrates the focus adjusting method according to the embodiment of the present invention related to FIGS. 1-3. As shown in FIG. 4, the focus adjusting method includes steps as the following:

Step 402: Capture a digital image DI.

Step 404: Calculate color characteristics of the digital image DI in the RAW image domain. The color statistics may be calculated by a dedicated image pre-processor and prior to the digital image DI is processed by the image signal processor.

Step 406: Determine a focus control algorithm to be used for controlling the lens unit of the image sensor module according to the color characteristics. The focus control algorithm may be determined according to a range where the color statistics lies in.

Step 408: Generate a focus control signal FC according to the focus control algorithm. The focus control signal FC comprises information of moving step and direction of the lens unit. Different focus control algorithms have different settings of the step and direction.

Step 410: Adjust the position of the lens unit according to the focus control signal FC. As described above, the lens unit thus moves a predetermined step toward a predetermined direction specified by the focus control signal.

Details of Step 406 are primarily disclosed in FIG. 3. Note that embodiments formed by reasonable combination/permutation of and/or adding the abovementioned limitations to the steps shown in FIG. 4 should also be regarded as embodiments of the present invention.

In some embodiments of the present invention, a region of interest (ROI) RoI of the digital image DI is further chosen for determining the color characteristics so as to reduce the computation complexity. The region of interest ROI of the digital image DI may be further selected via a user command when a user of the image capture device 100 previews the digital image DI.

According to one embodiment of the present invention, the image signal processor 130 is further configured to transfer information of the region of interest RoI to the dedicated image processing unit 120, i.e. the optional dotted path illustrated in FIG. 1 for transmitting the information of the region of interest RoI. The dedicated image processing unit 120 then parses the region of interest RoI to generate focus information of the region of interest RoI, and determines current sharpness of the region of interest RoI according to the focus information of the region of interest RoI.

The image signal processor 130 determines a proper focus control algorithm for adjusting the position of the lens unit 112 according to the current sharpness of the region of interest RoI, and detailed implementation may be easily determined by replacing the sharpness CS shown in FIGS. 2-3 with the sharpness of the region of interest RoI so that said detailed implementation will not be repeatedly described. As a result, a focus control signal corresponding to the sharpness value CS of the region of interest RoI may also be determined for the image sensor module 110 to adjust focus of the image capture device 100.

Figure 5:
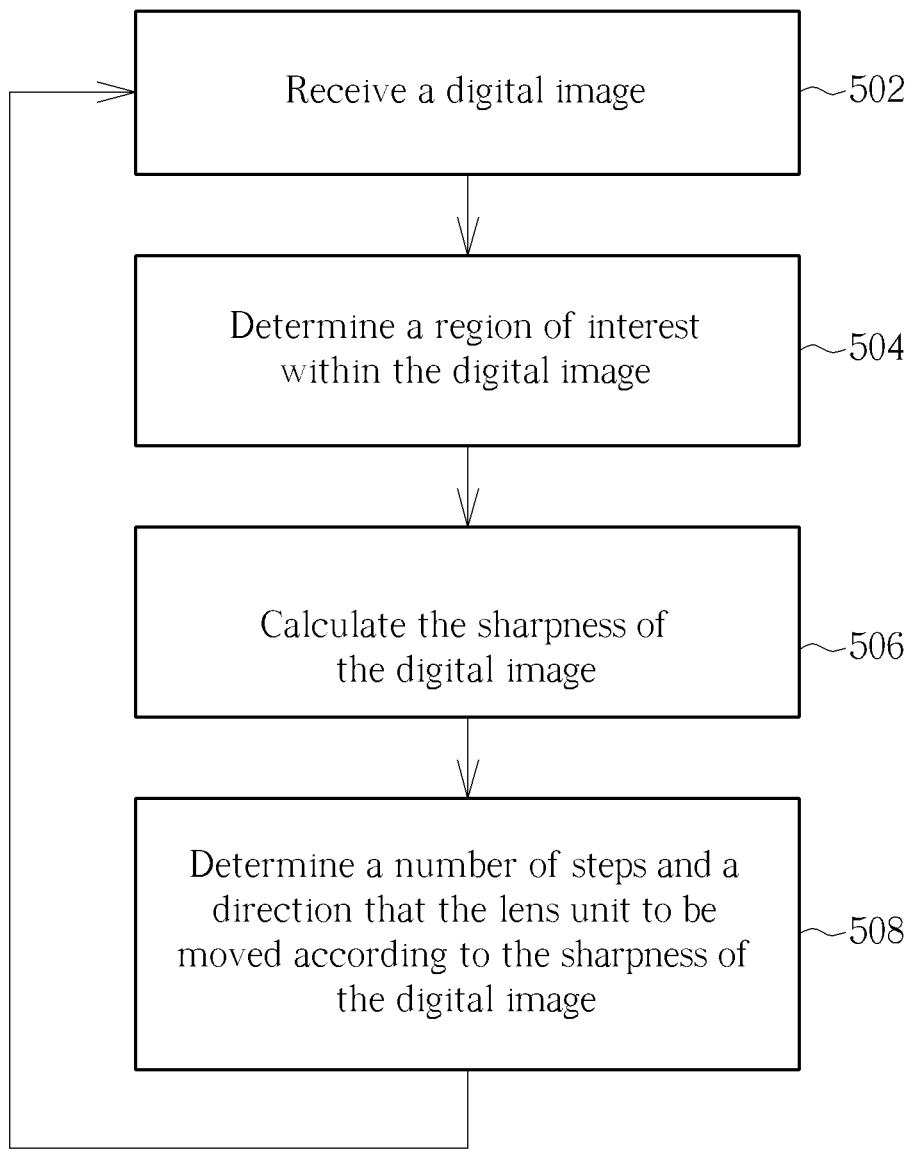
FIG. 5 illustrates a focus adjusting method of adjusting the focus of camera lens in response to a chosen region of interest according to one embodiment of the present invention.

Please refer to FIG. 5, which illustrates a focus adjusting method of adjusting the focus of the camera lens in response to the chosen region of interest RoI according to one embodiment of the present invention. The focus adjusting method includes steps as the following:

Step 502: Receive a digital image DI.

Step 504: Determine a region of interest within the digital image DI. The region of interest RoI may be determined via a user input command, a predefined setting (such as defining a center region), face detection, or object detection.

Step 506: Calculate the sharpness of the digital image DI according to pixels within the region of interest.

Step 508: Determine a number of steps and a direction that the lens unit to be moved according to the sharpness of the digital image DI.

Similarly, details of Step 508 are primarily disclosed in FIG. 3 except the sharpness CS is determined from the region of interest RoI. Therefore, embodiments formed by reasonable combination/permutation of and/or adding the above-mentioned limitations to the steps shown in FIG. 5 should also be regarded as embodiments of the present invention.

The present invention discloses a focus adjusting method and an image capture device utilizing the focus adjusting method. With the aid of the focus adjusting method and the image capture device, a fetched digital image or a region of interest within the fetched digital image can always be browsed with best focus performance by simply and rapidly adjusting a position of a lens unit of the image capture device according to color characteristics of the digital image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A focus adjusting method, comprising:
capturing a digital image by an image sensor module comprising a lens unit;
determining a region of interest (ROI) within the digital image;
calculating a sharpness value corresponding to the digital image according to pixels in the ROI of the digital image;
determining a number of steps and a direction for moving the lens unit according to the sharpness value;
in response to the sharpness value which is in a first range, moving the lens unit by a first number of steps in a first direction, the first number and the first direction being derived from a linear relationship;
in response to the sharpness value which is in a second range, moving the lens unit by a second number of steps in a second direction; and
in response to the sharpness value which is in a third range, performing a focus scan adjustment of the lens unit;
wherein the second number is predetermined.

2. The focus adjusting method of claim 1, wherein the determining of the ROI is based on a user input command, a predetermined region or an image processing algorithm, the image processing algorithm is one of face detection object detection.

3. The focus adjusting method of claim 1, wherein the calculating of the sharpness value is performed on each color channel of the RAW image domain separately.

4. The focus adjusting method of claim 1, wherein the calculating of the sharpness value is performed in the RAW image domain by a dedicated processing unit.

5. The focus adjusting method of claim 1, wherein the first range corresponds to a linear focus range, the second range corresponds to a directional focus range, and the third range corresponds to an out of focus range.

* * * * *